(12) United States Patent  
Khalifa

(10) Patent No.: US 11,193,665 B2  
(45) Date of Patent: Dec. 7, 2021

(54) WATER-COOLED GROW LIGHT APPARATUS

(71) Applicant: Mohammed M. Khalifa, Walnut, CA (US)

(72) Inventor: Mohammed M. Khalifa, Walnut, CA (US)

(*) Notice: Subject to any disclaimer, the term of this patent is extended or adjusted under 35 U.S.C. 154(b) by 0 days.

(21) Appl. No.: 17/005,709

(22) Filed: Aug. 28, 2020

(65) Prior Publication Data

US 2021/0063007 A1 Mar. 4, 2021

Related U.S. Application Data

(60) Provisional application No. 62/892,891, filed on Aug. 28, 2019.

(51) Int. Cl.
| | |
|---|---|
| *F21V 29/56* | (2015.01) |
| *F21V 23/00* | (2015.01) |
| *F21V 29/74* | (2015.01) |
| *F21V 29/60* | (2015.01) |
| *A01G 7/04* | (2006.01) |
| *F21V 23/04* | (2006.01) |
| *F21V 23/06* | (2006.01) |
| *F21Y 115/10* | (2016.01) |
| *F21Y 113/20* | (2016.01) |
| *F21Y 113/10* | (2016.01) |

(52) U.S. Cl.
CPC .............. *F21V 29/56* (2015.01); *A01G 7/045* (2013.01); *F21V 23/003* (2013.01); *F21V 23/04* (2013.01); *F21V 29/60* (2015.01); *F21V 29/74* (2015.01); *F21V 23/06* (2013.01); *F21Y 2113/10* (2016.08); *F21Y 2113/20* (2016.08); *F21Y 2115/10* (2016.08)

(58) Field of Classification Search
CPC ................................................. F21V 29/56–59
See application file for complete search history.

(56) References Cited

U.S. PATENT DOCUMENTS 10,238,043 B1 * 3/2019 Vardi ..................... A01G 7/045

* cited by examiner

*Primary Examiner* — Sean P Gramling  
(74) *Attorney, Agent, or Firm* — Gurr Brande & Spendlove, PLLC; Robert A. Gurr

(57) ABSTRACT

A water-cooled grow light apparatus has a housing, cooling components, and light components. The housing stores the cooling and light components. The cooling components regulate the heat produced by the light components. While the cooling components are regulating the heat, the light components power the water-cooled grow light apparatus and produce the full spectrum of light.

3 Claims, 7 Drawing Sheets

WATER-COOLED GROW LIGHT APPARATUS

CROSS-REFERENCE TO RELATED APPLICATIONS

This application claims the benefit of U.S. Provisional Application Ser. No. 62/892,891, filed on Aug. 28, 2019, which is incorporated herein by reference.

TECHNICAL FIELD

The present disclosure relates to grow lights. More particularly, the present disclosure relates to a grow light that is water-cooled with a full spectrum of light.

BACKGROUND

Plants are an integral part of humanity and provide many benefits for the human body. Some of these benefits come in the form of food, medicine, and oxygen. Without them, humanity would cease to exist. It is important that plants have the right surroundings for growth. There are many things that go into the growth of a plant, such as water, soil, nutrients, and sunlight. Each plant may require varying degrees of sunlight or nutrients, but it is important that all of the above are present. Sunlight is one of the most important factors in the growth of a plant. Plants consume the sunlight in a process called "photosynthesis", which is when light is converted from being light energy to chemical energy within a plant. Chemical energy fuels a plant's activities and allows it to survive. Without photosynthesis, a plant would not have the energy to carry out its survival activities, thereby killing the plant. It is important to note that photosynthesis cannot occur in some environments due to weather, and it cannot occur without light.

Accordingly, grow lights were created to provide the necessary light for a plant without having to rely on the sun, allowing plants to be grown at all times of the day and year and in numerous environments. Grow lights extend the amount of time a plant can receive light for growth. Typically, grow lights try to imitate light similar to that produced by the sun. In other circumstances, grow lights may have more growing adjustments to imitate a specific plant's natural environment, such as altering temperature and color.

Even with the benefits of grow lights, there are still shortcomings. For example, they may not produce enough power, are limited in function such as lights and colors, are limited on usability, and are often noisy. Another major issue that comes from grow lights is overheating. When these lights overheat, it can cause significant damage to the grow light itself as well as create an environment that is too hot and not conducive to growing. Too much heat may also damage the plants. Additionally, it is difficult to control the heat on grow lights due to the amount of lights used.

Attempts have been made to cool the grow lights in the form of heat sinks. Heat sinks typically contain fans and pieces of metal (typically arranged as fins) that will move heat produced by an electronic device to the atmosphere away from the electronic device. Specifically, the fins will absorb the warmth generated by the electronics and then the fan will move the heat out of the fins. Heat sinks are capable of cooling many electronic devices; however, grow lights continually become overheated even when heat sinks are used. If the grow lights continually overheat, they can fail. With the numerous lights that are present on grow light systems, heat sinks are incapable of dissipating the heat sufficiently. As a result, there remains a need to dissipate heat more effectively in grow light systems.

Accordingly, there is a need for a grow light that is quiet, easy to operate, does not overheat, and creates all types of growing environments by using numerous lights in various colors. The present disclosure seeks to solve these and other problems.

SUMMARY OF EXAMPLE EMBODIMENTS

In one embodiment, a water-cooled light apparatus comprises a housing with a cooling system and light components. The housing comprises a top, a bottom, a front, a back, a first side, and a second side. The housing further comprises at least one fan aperture on both the first and second sides. On the top, the housing comprises coupling sites so as to connect suspension devices. The back of the housing has a plurality of vents. To control the functionality of the apparatus, the front of the housing comprises power switches, at least one power adjuster, a power socket, and a timer display. Further, the cooling system comprises a cooling fin, a pump, and fans. The cooling system maintains the temperature of the light components, which includes small lenses and large lenses, small and large lights, a control board, a controller, and a light power supply. While the cooling system regulates the heat, the light components power the water-cooled grow light apparatus and produce a full spectrum of light.

DETAILED DESCRIPTION OF EXAMPLE EMBODIMENTS

Figure 1:
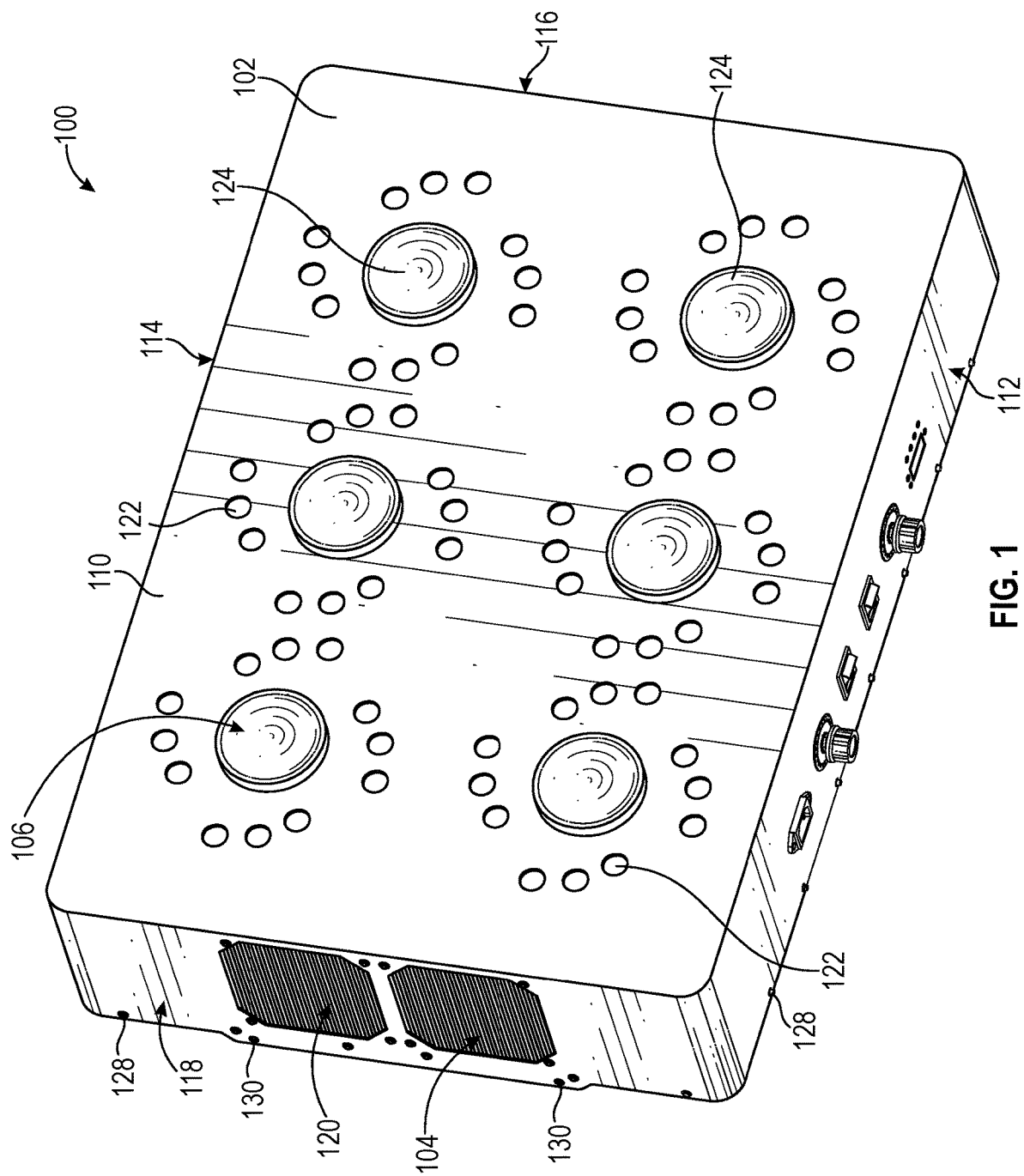
FIG. 1 illustrates a bottom, front perspective view of a water-cooled grow light apparatus.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As discussed earlier, there is a need for a grow light apparatus that is quiet, easy to operate, does not overheat, and creates all types of growing environments by using numerous lights in various colors. The present disclosure seeks to solve these and other problems.

Many grow lights found in the prior art have a tendency to overheat due to the numerous electrical components and the lights. These electrical components create a lot of heat that, if not removed from the grow light, will damage the grow light and may also damage the plants. Attempts have been made to dissipate the heat produced by the grow light via fans and heat sinks. However, these attempts to remove heat from a grow light are ineffective, leading to a grow light that continually overheats and is eventually damaged.

In contrast, the water-cooled grow light apparatus described herein comprises a housing, a cooling system, and light components. The housing stores the cooling system and light components. The cooling system regulates the heat produced by the light components by utilizing a water-cooling system that transfers heat from the light components to the water traveling through the system. In addition to the water-cooling system, the water-cooled grow light apparatus may also utilize fans and heat sinks to further remove heat produced by the grow light apparatus. While the cooling system regulates the heat, the light components power the water-cooled grow light apparatus and produce a full spectrum of light. It will be appreciated that the water-cooled grow light apparatus may produce the full spectrum of light at a variety of intensities while not overheating.

In one embodiment, as shown in FIGS. 1-4, a water-cooled grow light apparatus 100 comprises a housing 102 with a cooling system 104 and light components 106. The housing 102 is generally rectangular in shape and comprises a top 108, a bottom 110, a front 112, a back 114, a first side 116, and a second side 118. The housing 102 can be of varying sizes depending on the end use, such as compact for home use or large for commercial growing operations. It will also be appreciated that the housing 102 can come in different shapes as well as materials. For example, the housing 102 can be made of plastic or metal and be in a circular shape or other formfactor. The housing 102 further comprises at least one fan aperture 120 on the first and second sides 116, 118. As shown in FIG. 1, the bottom 110 has a plurality of small lenses 122 and a plurality of large lenses 124. While the water-cooled grow light 100 is illustrated as having six large lenses 124, other embodiments may comprise more or fewer. Similarly, other embodiments may have more or fewer small lenses than that shown.

Figure 2:
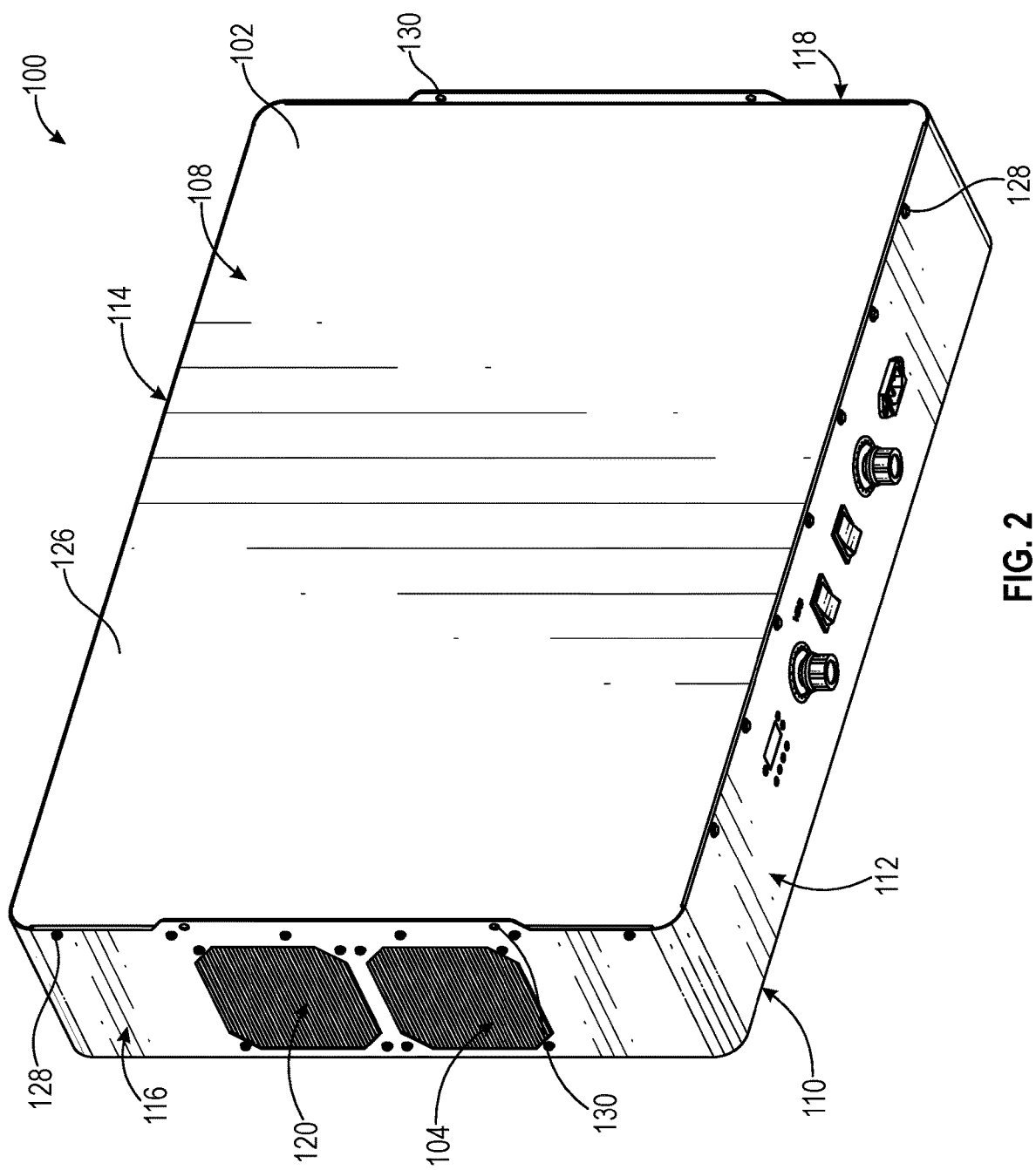
FIG. 2 illustrates a top, front perspective view of a water-cooled grow light apparatus.
Figure 3:
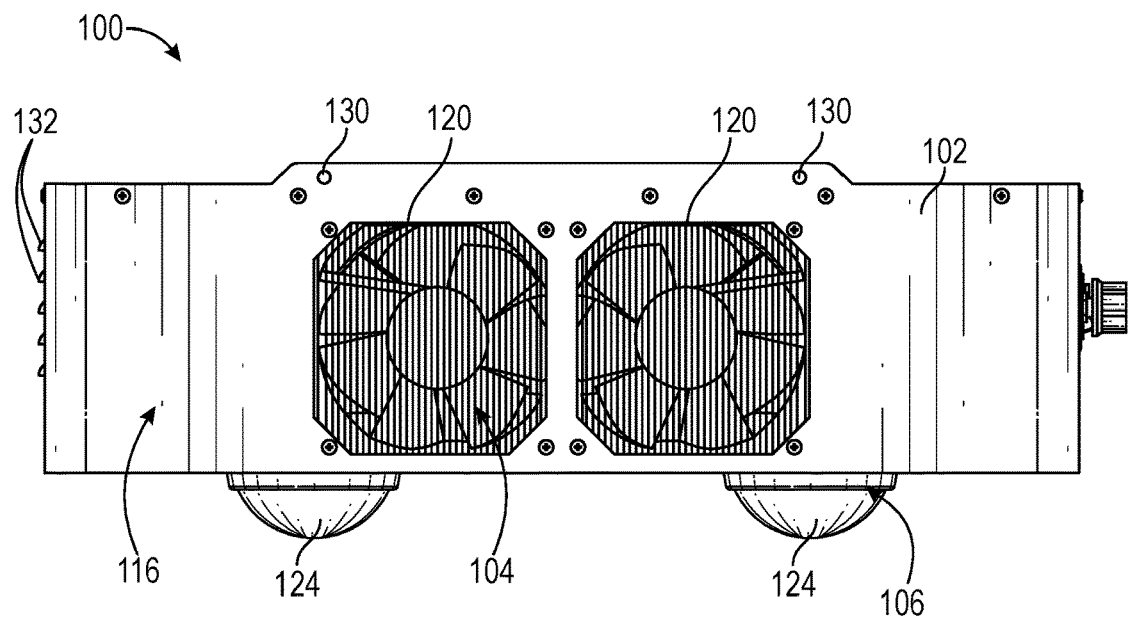
FIG. 3 illustrates a left, side elevation view of a water-cooled grow light apparatus.
Figure 4:
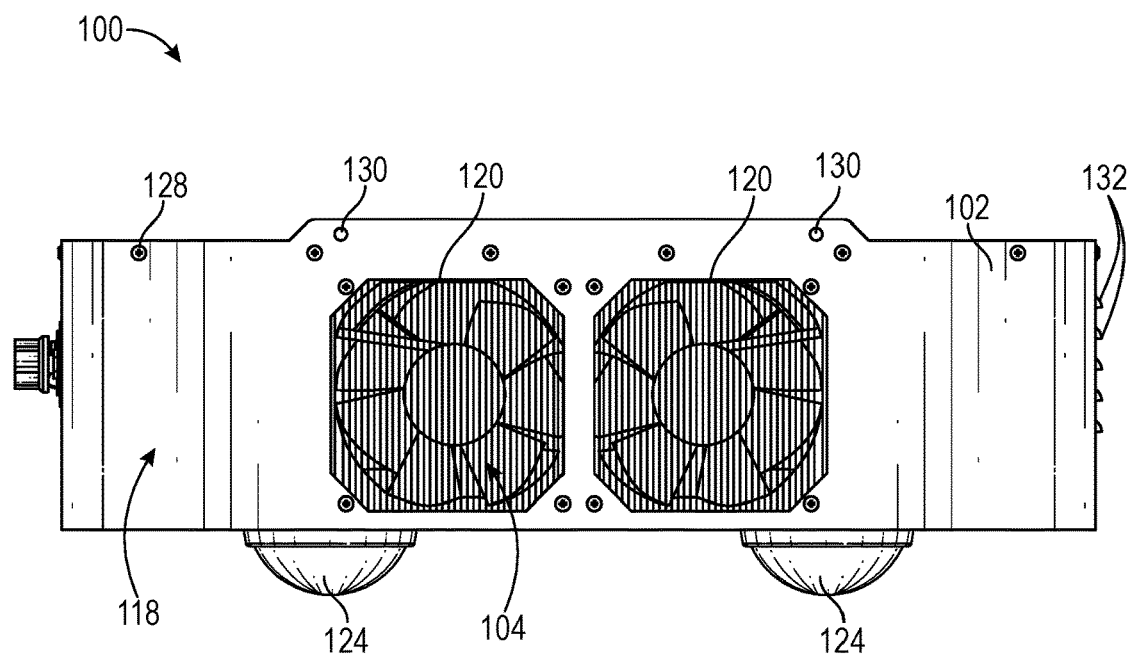
FIG. 4 illustrates a right, side elevation view of a water-cooled grow light apparatus.

Referring to FIG. 2, the top 108 of the water-cooled grow light 100 comprises a removably attachable top panel 126 that acts as a lid. To adjust the inner workings of the water-cooled grow light 100, a user removes the plurality of top panel bolts 128 and the removably attachable top panel 126. Another non-limiting example of removing the top panel 126 includes a first side having a latch coupled thereto, with the opposite, second side having hinges. Further, the housing 102 comprises coupling sites 130 so as to connect suspension devices, such as cables or chains. In use, a user may attach suspension devices to the coupling sites 130 and attach the water-cooled grow light 100 to an elevated structure (e.g., a ceiling).

Figure 5:
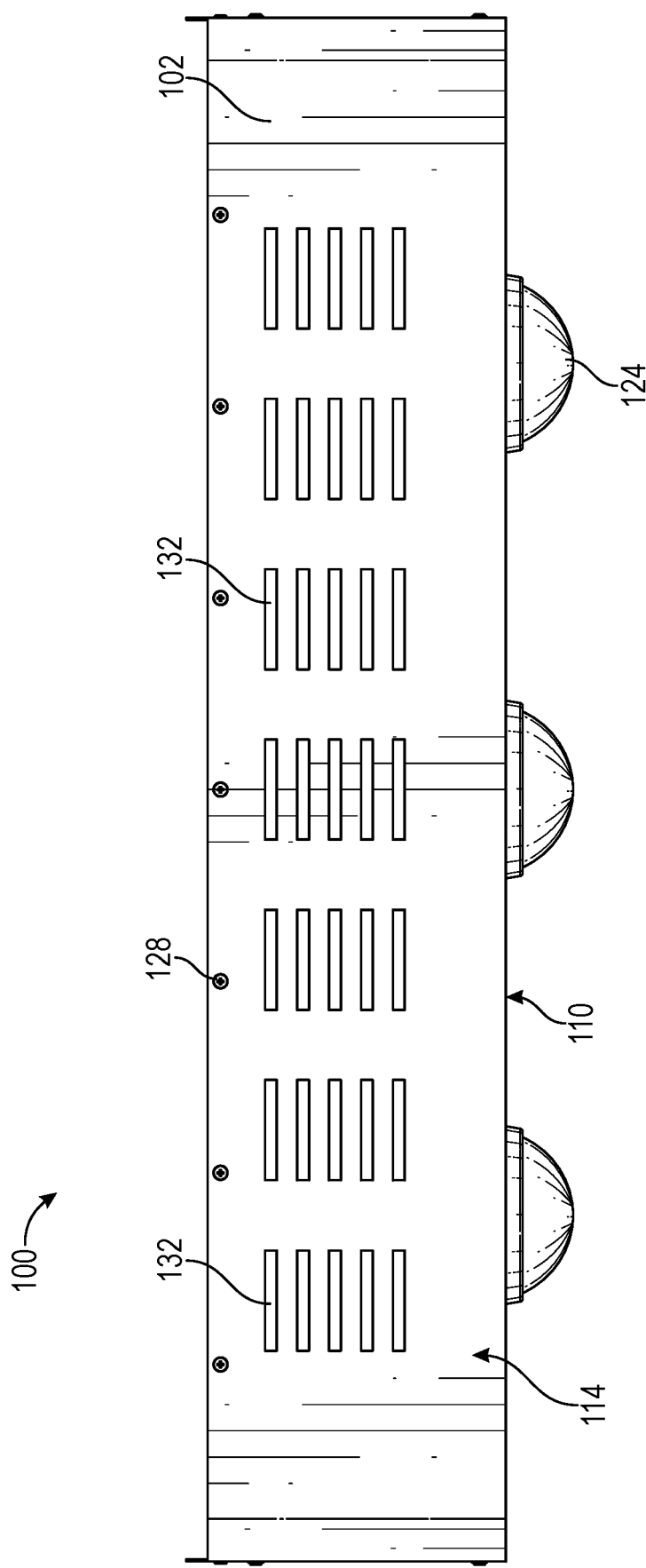
FIG. 5 illustrates a rear elevation view of a water-cooled grow light apparatus.
Figure 6:
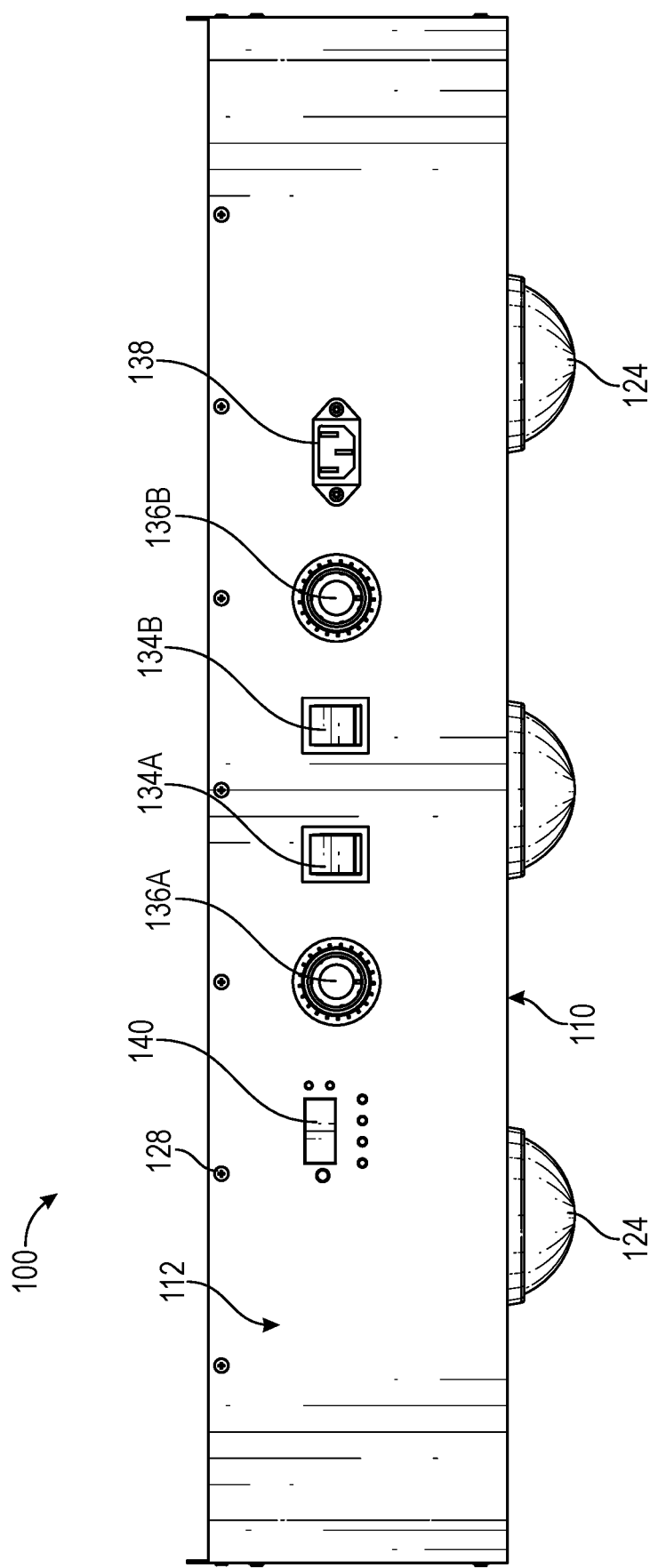
FIG. 6 illustrates a front elevation view of a water-cooled grow light apparatus.

Referring to FIG. 5, the back 114 of the housing 102 has a plurality of louvers (air vents) 132 to allow for fresh air intake that can cool electrical components, thereby assisting in cooling the water-cooled grow light 100. Referring to FIG. 6, the front 112 of the housing 102 comprises switches 134A, 134B, at least one power adjuster (e.g., a potentiometer or a dimmer switch) 136A, 136B, a power socket (e.g., alternating current or direct current) 138, and a timer display 140. The switches 134A, 134B may comprise a flip switch; however, it may also be levers, turn knobs, push button, etc. The switches 134A, 134B may turn the power on and off, operate the lights and their color, and/or control the cooling components.

The power adjuster 136A, 136B allows a user to determine the amount/intensity of light that is casted on the plants. In some embodiments, one power adjuster 136A may adjust all the lights simultaneously. In an alternate embodiment, a plurality of power adjusters 136A, 136B may adjust lights independently. The power adjuster 136A, 136B may comprise a potentiometer, which is a three-terminal resistor. However, other power adjusters may be used, such as a dimmer switch. The power for the water-cooled grow light 100 comes through the power socket 138, which may be direct current or alternating current. The power socket 138 may be in a variety of configurations so that it can be an accepted by power cords anywhere in the world. For example, the power socket 138 may be US-3P, AG2-P, UK-3P, etc.

The timer 140 may be a digital display that can notify a user of a specific time period that the grow lights are on. For example, a user can set the water-cooled grow light 100 to remain on for eight hours a day for a week. After the eight hours have passed, the water-cooled grow light 100 automatically shuts off until the next day. In an alternate embodiment, a water-cooled grow light 100 comprises wireless controls, where a user could use their electronic device, such as a smartphone with an application, to set the time that the grow light will be activated, the color, and strength of the light beams. In such an example, the water-cooled grow light would comprise necessary components, such as a wireless transceiver and a microcontroller. While the digital display for the timer 140 may be shown, it will be appreciated by one in the art that the timer 140 may be a turn knob, touchscreen, etc.

Figure 7:
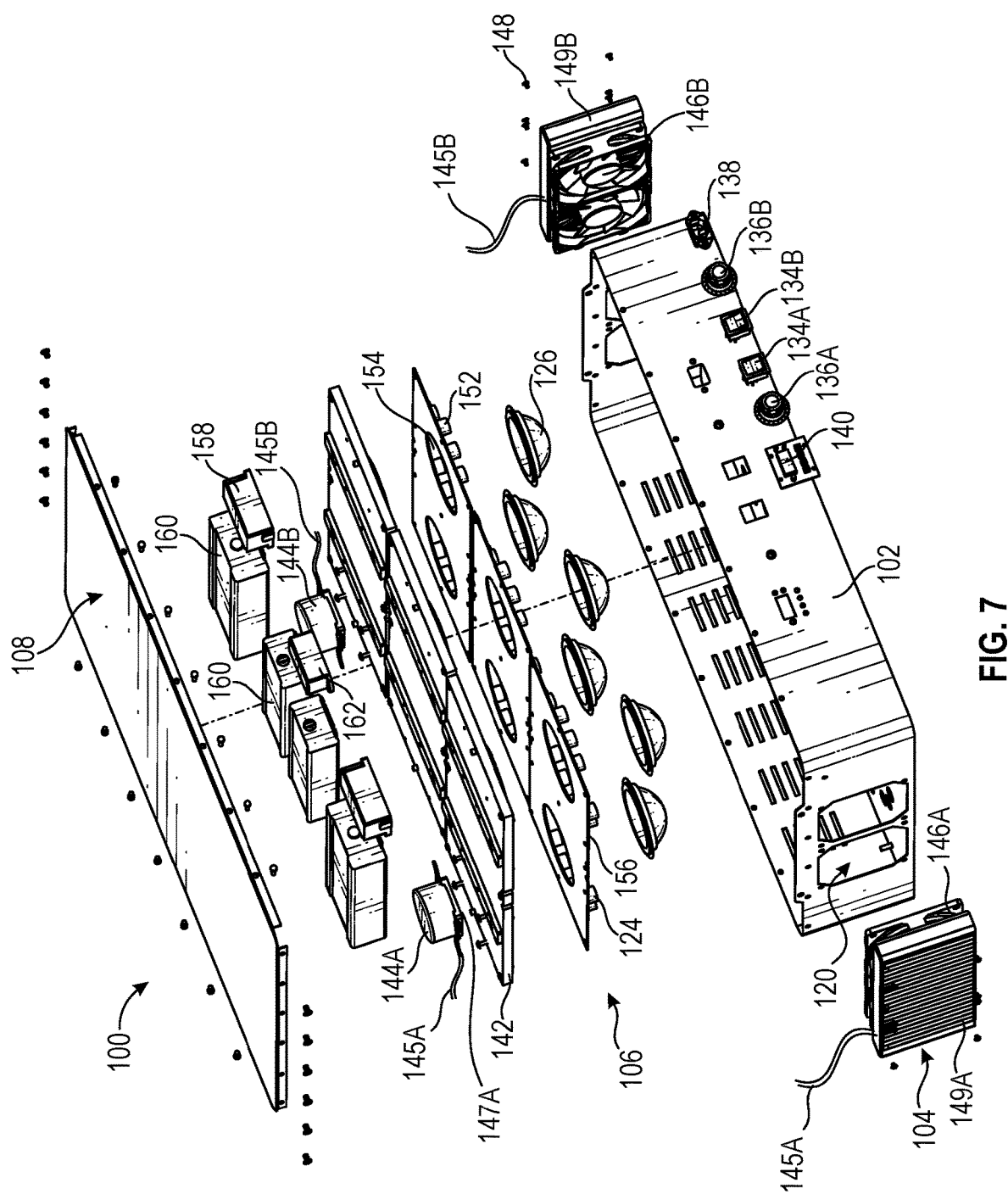
FIG. 7 illustrates an exploded view of a water-cooled grow light apparatus.
Figure 8:
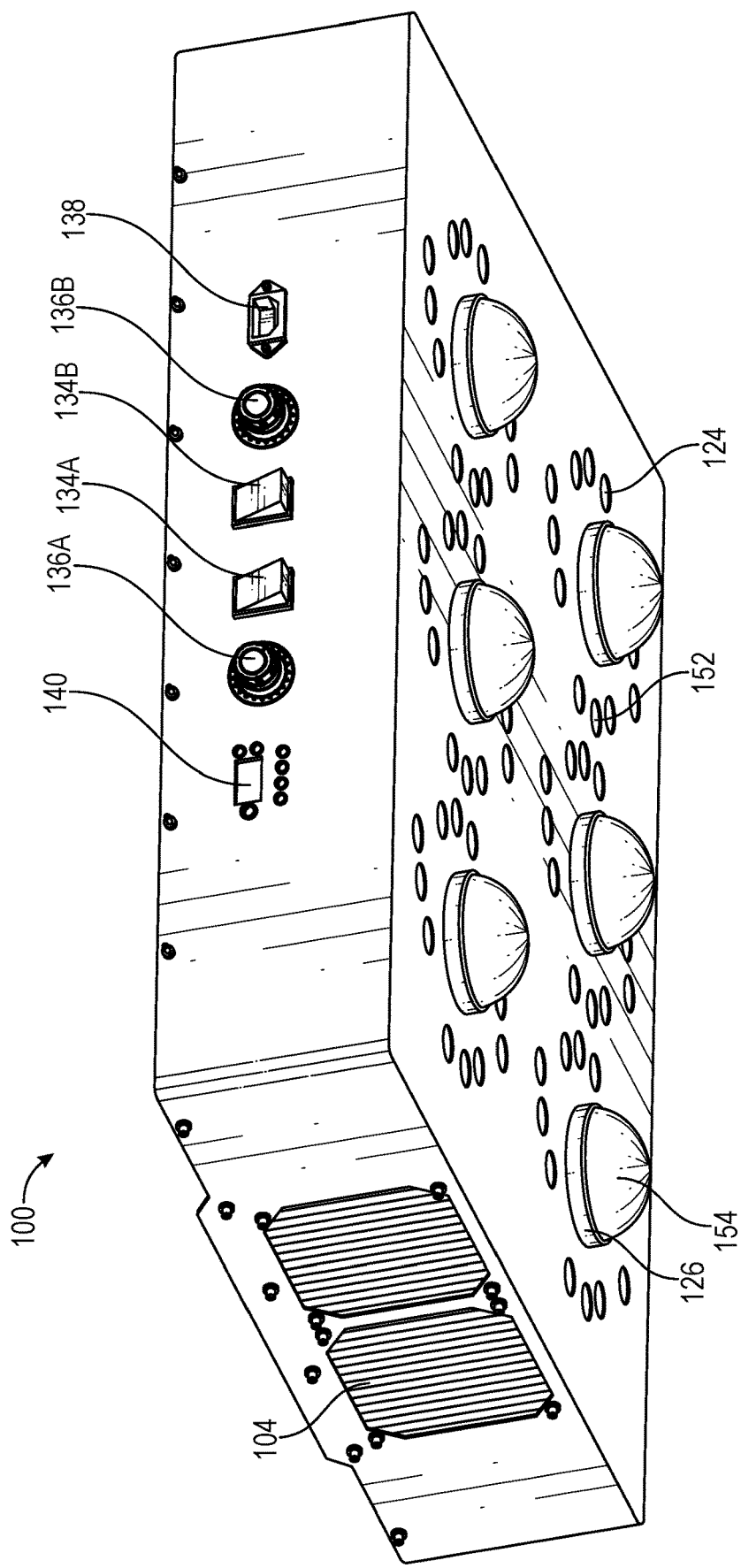
FIG. 8 illustrates a bottom, front perspective view of a water-cooled grow light apparatus.

Further, as shown in FIGS. 7-8, the cooling system 104 may comprise a cooling fin 142, a pump 144, fans 146, and a fan power supply 162 to prevent the apparatus 100 from overheating. The cooling fin 142 increases the surface area within the water-cooled grow light 100 to transfer heat. Specifically, the cooling fin 142 is rectangular in shape to cover all the light components 106 within the water-cooled grow light 100. The cooling fin 142, which may be made of copper, aluminum, or other thermally conductive materials, pulls heat from the light components 106 (e.g., LEDs, circuit board, power supply, etc.) due to it being in contact with one or more of the light components 106. The heat moves from the side of the cooling fin 142 in contact with the light components 106 to the side opposite the light components 106.

The fans 146 are found in the fan apertures 120 on the first and second sides 116, 118. The fans 146 are held in place by a plurality of fan bolts 148. The fans 146 may remove hot air from the housing 102. At the same time, the hot air is being removed from the housing 102 by the fans 146, the cooling fin 142 is also cooled and prepared to transfer additional heat.

In one embodiment, a plurality of pumps 144A, 144B move water through a plurality of tubes 145A, 145B that are each coupled to one or more fans 146A, 146B. Each pump 144A, 144B has a base plate 147A made from a heat conductive material such as copper (or other thermally conductive material) that is in contact with the cooling fin 142. The base plate 147A draws heat from the cooling fin 142, with the base plate 147A being water-cooled via water circulating through the tubes 145A, 145B to radiators 149A, 149B coupled to the fans 146A, 146B, respectively, which cools the water passing therethrough efficiently. As a result, heat is dissipated from the electronic components much faster, which allows the system to remain on for extended periods without risking system integrity. While disclosed using a base plate 147A, the invention is not so limited. For example, the cooling fin 142 may have one or more channels therein or thereon that allow for the passing of water, allowing the entire cooling fin 142 to be cooled without the need for a base plate. In such a scenario, the pump may be located anywhere along the system.

The prior art lacks a water-cooled lighting system that is integrated within a grow light. Without a water-cooled system, the grow lights have a tendency of overheating due to the heat generated by the plurality of lights and electrical components. In contrast, the water-cooled grow light 100 comprises a water cooling system 104 (e.g., heat sink 142 (also referred to as a "cooling fin"), base plate 147A, pump 144A, 144B, tubes 145A, 145B, fans 146A, 146B, and radiators 149A, 149B) so that the apparatus 100 does not overheat and ruin the inner components or plants.

The cooling components 104 maintain the temperature of the light components 106. The light components 106 may comprise small and large lights 152, 154 covered by small and large lenses 122, 124, a circuit board 156, a controller 158, and a light power supply 160. The small lenses 122 cover the small lights 152 to project, for example, the desired color onto the plants. The large lenses 126 project the large lights 154 to provide a large light projection/ footprint. Essentially, the small and large lenses 124, 126 focus the light into a wide beam or a narrow beam, depending on the need of the user. The small and large lenses 124, 126 may be made of many materials, such as glass or plastic. The small and large lights 152, 154 may be light-emitting diodes (LEDs); however, they are not limited to being LED and may be fluorescent, high intensity discharge lights (HID), etc. Small and large lens apertures receive the small and large lights 152, 154 with their small and large lenses 124, 126. The large lights 154 may be of a single color, such as white light. In contrast, the small lights 152 may produce multiple colors, such as red, blue, and green. To cover the full spectrum of light, the large lights 154 can be used simultaneously with the small lights 152. When the full spectrum of light is used, many environments can be imitated so that numerous varieties of plants can be grown. However, it will be appreciated that the large and small lights may be one or many colors.

The circuit board 160 allows signals to be sent to the different cooling components 104 and light components 106. The circuit board 160 may be a printed circuit board, which is made out of an epoxy or fiberglass. In an alternate embodiment, the circuit board 160 comprises an aluminum backing so as to conduct signals and act as a heat sink. The aluminum circuit board serves dual functions, saving on space within a device and saving money that would have been spent on purchasing a heat sink and circuit board separately. In such a scenario, the pump 144A, 144B and base 147A would be in direct contact with the aluminum surface of the circuit board. Further, the controller 162 (e.g., microcontroller) may be a chip, microchip, or a card, that interfaces with multiple components in the water-cooled grow light 100.

Accordingly, it will be appreciated that the water-cooled grow light offers numerous growing environments for any plant and does not overheat due to the water-cooled system.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A water-cooled grow light apparatus comprising:
   a housing comprising coupling sites for attaching the grow light apparatus to an elevated structure;
   at least one power switch, at least one power adjuster, and a timer display;
   a first fan aperture on a first side to receive a first fan;
   a second fan aperture on a second side to receive a second fan;
   a first radiator coupled to the first fan and a second radiator coupled to the second fan;
   a removably attachable top panel;
   a plurality of louvers to allow for air flow through the housing;
   a cooling system comprising a cooling fin, a first pump and a second pump each having a thermally conductive base plate in contact with the cooling fin, a plurality of tubes to allow for water circulation between the first radiator and the first pump and the second radiator and the second pump, respectively; and
   a plurality of first lights comprising a single color and having a first size and a plurality of second lights comprising multiple colors and having a second size, wherein the first size of the plurality of first lights is larger than the second size of the plurality of second lights.

2. The water-cooled grow light apparatus of claim 1, wherein the base plate comprises copper.

3. The water-cooled grow light apparatus of claim 1, wherein the at least one power adjuster comprises a potentiometer.

* * * * *